United States Patent
Nambara (10) Patent No.: US 9,835,858 B2
(45) Date of Patent: Dec. 5, 2017

(54) HEAD-UP DISPLAY DEVICE AND ILLUMINATING DEVICE FOR HEAD-UP DISPLAY DEVICE

(71) Applicant: DENSO CORPORATION, Kariya, Aichi-pref (JP)

(72) Inventor: Takahiro Nambara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/899,492

(22) PCT Filed: Jun. 19, 2014

(86) PCT No.: PCT/JP2014/003285
§ 371 (c)(1),
(2) Date: Dec. 17, 2015

(87) PCT Pub. No.: WO2014/203534
PCT Pub. Date: Dec. 24, 2014

(65) Prior Publication Data
US 2016/0147061 A1    May 26, 2016

(30) Foreign Application Priority Data
Jun. 20, 2013    (JP) .................................. 2013-130061

(51) Int. Cl.
G02B 27/14    (2006.01)
G02B 27/01    (2006.01)
(Continued)

(52) U.S. Cl.
CPC .......... *G02B 27/0101* (2013.01); *B60K 35/00* (2013.01); *G02B 3/0006* (2013.01);
(Continued)

(58) Field of Classification Search
CPC ........ G02B 27/0101; G02B 2027/0121; G02B 2027/013; G02B 2027/0103; G02B 2027/0196; G02B 2027/01
(Continued)

(56) References Cited

U.S. PATENT DOCUMENTS

2001/0044010 A1* 11/2001 Freeman .................... B32B 3/02
                                                                  428/157
2004/0262053 A1    12/2004 Ludewig et al.
(Continued)

FOREIGN PATENT DOCUMENTS

CN    201177183 Y    1/2009
JP    2004126025 A    4/2004
(Continued)

OTHER PUBLICATIONS

International Search Report and Written Opinion (in Japanese with English Translation) for PCT/JP2014/003285, dated Jul. 22, 2014; ISA/JP.

*Primary Examiner* — Bumsuk Won
*Assistant Examiner* — Tamara Y Washington
(74) *Attorney, Agent, or Firm* — Harness, Dickey & Pierce, P.L.C.

(57) ABSTRACT

An image displayed on an image display unit is illuminated by an image illumination unit, and the image is displayed for a driver using a display optical system having at least one concave mirror element. The image illumination unit has a light emitting surface that emits an illumination light, and a lens array that divides and focuses an entrance pupil of an eye box onto the light emitting surface. With the above configuration, since the light emitting surface and the eye box have a conjugate relationship through the lens array and the display optical system, the light emitted from the light emitting surface can efficiently reach the eye box. As a result, since the light can be efficiently used for illumination, (Continued)

the image having high luminance can be displayed without any increase in the luminance of a light source and any reduction in the number of displayable colors.

10 Claims, 7 Drawing Sheets

(51) Int. Cl.
  *B60K 35/00* (2006.01)
  *G02B 3/00* (2006.01)
  *G02B 5/02* (2006.01)
  *G02B 5/10* (2006.01)
  *F21V 8/00* (2006.01)
(52) U.S. Cl.
  CPC ............... *G02B 5/02* (2013.01); *G02B 5/10* (2013.01); *G02B 6/0096* (2013.01); *G02B 27/01* (2013.01); *G02B 2027/0118* (2013.01); *G02B 2027/0123* (2013.01)
(58) Field of Classification Search
  USPC ........................................ 359/631; 345/7–9
  See application file for complete search history.

(56) References Cited

U.S. PATENT DOCUMENTS

| | | |
|---|---|---|
| 2005/0052617 A1 | 3/2005 | Fujikawa et al. |
| 2009/0059341 A1 | 3/2009 | Kinugawa et al. |
| 2013/0208363 A1 | 8/2013 | Masuda |
| 2014/0022645 A1 | 1/2014 | Matsuura et al. |
| 2014/0029430 A1 | 1/2014 | Samuels et al. |

FOREIGN PATENT DOCUMENTS

| | | |
|---|---|---|
| JP | 2005505796 A | 2/2005 |
| JP | 2005070255 A | 3/2005 |
| JP | 2006019027 A | 1/2006 |
| JP | 2009075547 A | 4/2009 |
| JP | 2010153239 A | 7/2010 |
| JP | 2012203176 A | 10/2012 |
| JP | 2013164512 A | 8/2013 |
| JP | 2014029430 A | 2/2014 |

* cited by examiner

HEAD-UP DISPLAY DEVICE AND ILLUMINATING DEVICE FOR HEAD-UP DISPLAY DEVICE

CROSS-REFERENCE TO RELATED APPLICATIONS

This application is a U.S. National Phase Application under 35 U.S.C. 371 of International Application No. PCT/JP2014/003285 filed on Jun. 19, 2014 and published in Japanese as WO 2014/203534 A1 on Dec. 24, 2014. This application is based on and claims the benefit of priority from Japanese patent application No. 2013-130061 filed on Jun. 20, 2013. The entire disclosures of all of the above applications are incorporated herein by reference.

TECHNICAL FIELD

The present disclosure relates to a head-up display device that projects an image onto a transparent plate member disposed in front of a driver's seat to display the image superimposed on a view in front of the driver's seat as a virtual image, and an illuminating device for the head-up display device.

BACKGROUND ART

A head-up display device (hereinafter referred to as "HUD device") that projects an image onto a transparent plate member (a combiner or a windshield) disposed in front of a driver's seat to display the image superimposed on the view in front of the driver's seat as a virtual image has been known. The HUD device displays the image to be projected on a liquid crystal screen, and irradiates the liquid crystal screen with a light from a back side of the liquid crystal screen to project the image.

In the HUD device, because the image displayed to be superimposed on the front view needs to be clearly visible even during good weather, it is required that the image can be displayed with a sufficiently high luminance as the virtual image. To meet that requirement, the luminance of a light source for irradiating the liquid crystal screen with light from the back side may be increased. However, in that case, the amount of heat radiation of the light source increases, and a large space for housing the light source is required.

Under the circumstances, a technique in which the liquid crystal screen normally including three kinds of pixels of red pixels, green pixels, and blue pixels is configured by two kinds of pixels of red pixels and green pixels has been proposed (Patent Literature 1). With the above configuration, since the density of pixels that emit light on the liquid crystal screen per unit area can be increased, the luminance of the image displayed as the virtual image can increase even if the luminance of the light source does not increase.

PRIOR ART LITERATURE

Patent Literature

Patent Literature 1: JP 2009-075547 A

SUMMARY OF THE INVENTION

However, in the proposed technique, since no blue pixels are present on the liquid crystal screen, displayable colors are restricted. In other words, if the red color, the green color, and the blue color corresponding to three primary colors of the light can be displayed, all of practical colors can be displayed with the mixture of those colors. However, in the technique according to Patent Literature 1, since blue cannot be displayed, the displayable colors can be remarkably restricted.

The present disclosure has been made in view of the above problem, and aims at providing a technique in which an image high in luminance can be displayed as a virtual image by an HUD device without any increase in the luminance of the light source or a reduction in the number of displayable colors.

The head-up display device and the illuminating device according to the present disclosure display an image to be displayed for a driver on an image display unit, and illuminate the displayed image to display a virtual image for the driver. A lens array is disposed between the image display unit and a light emitting surface that emits the light for illuminating the image displayed on the image display unit.

The light emitting surface may be any surface that emits the light, and may be formed of a light emitting surface that emits the light, a transmission surface that transmits the light from the internal, or a diffusion surface that diffuses the light.

The lens array can shorten a focal length as the lens array is formed of multiple small lenses, and can realize a large lens diameter in the overall lens array. For that reason, even when a distance between the image display unit and the light emitting surface is short, the light from the light emitting surface can be efficiently focused. As a result, the overall image of the image display unit can be illuminated, and the image high in luminance can be displayed as the virtual image.

In the lens array, the multiple small lenses may be arranged in a row or a two-dimensional form. Therefore, the multiple small lenses may be formed integrally, or the lens array may be formed by arranging the multiple small lenses that are separately formed.

In the above-mentioned head-up display device according to the present disclosure, the image displayed and illuminated on the image display unit may be displayed for the driver as the virtual image through a display optical system having at least one concave mirror element. Using the lens array disposed between the image display unit and the light emitting surface, an entrance pupil of an eye box formed through the display optical system may be divided and focused onto the light emitting surface.

With the above configuration, since the light emitting surface and the eye box have a conjugate relationship through the lens array and the display optical system, the light emitted from the light emitting surface toward the lens array always reaches the eye box. For that reason, since the light emitted from the light emitting surface can be efficiently used, the image high in luminance can be displayed as the virtual image.

The concave mirror element can be formed of a so-called concave mirror or a so-called combiner that is made of a transparent material and reflects the light projected from an oblique direction.

In the above-mentioned head-up display device according to the present disclosure, the image may be projected onto a transparent plate member disposed in front of a driver through the concave mirror to display the projected image as the virtual image.

With the above configuration, since the image can be projected onto a windshield of the vehicle, the large image can be displayed as the virtual image. In the head-up display device according to the present disclosure, the image high in luminance can be displayed. Therefore, even if the displayed image becomes large, a sufficient luminance can be ensured.

In the above-mentioned head-up display device according to the present disclosure, the image may be illuminated from a back side of a transmission image display unit that displays the image by changing transmittance of the light.

The image display unit may be a reflection image display unit that controls angles of minute reflectors arrayed in a matrix to display the image. In the transmission image display unit, a distance between the image display unit and the light emitting surface can be shortened. In the above-mentioned head-up display device according to the present disclosure, even if the distance between the image display unit and the light emitting surface is shortened, an image of the eye box can be divided and focused on the light emitting surface using the lens array. Therefore, the light can be efficiently used for illumination. As a result, the head-up display device that can display the image with high luminance while being reduced in size can be realized.

In the above-mentioned head-up display device according to the present disclosure, a light pipe, in which a light of a light source input from one end side is reflected with an inner peripheral side surface of the light pipe, and output from an other end side, may be provided, and the light emitting surface may be provided at an end surface on an emission side of the light pipe. The light pipe may be configured by forming a reflective layer on a peripheral side surface of a transparent member or forming the reflective layer on an inner peripheral surface of a cylindrical member.

With the above configuration, the light input from one end side of the light pipe can be efficiently led to the light emitting surface. By setting one end of the light pipe to be close to the light source, the light from the light source can be efficiently input to the light pipe. As a result, since the light emitted by the light source can be efficiently used for illumination, the image can be displayed with high luminance.

Further, the light input from one end side of the light pipe travels in the light pipe while the reflection with the inner peripheral side surface of the light pipe is repeated. Therefore, even if the luminance or color is biased at the time the light is inputted, the light is equalized until when the light emits from the other end surface. For that reason, even if a position of driver's eyes moves within the eye box, the image can be displayed with the same brightness and color as the virtual image.

In the above-mentioned head-up display device according to the present disclosure, a diffusion unit that diffuses the light emitted from the end surface may be disposed at the end surface on the emission side of the light pipe.

With the above configuration, since the light emitted from the end surface of the light pipe is further equalized by the diffusion unit, the light pipe can be shortened. As a result, the head-up display device can be reduced in size.

In the diffusion unit, a plate diffusion member may be disposed on the end surface on the emission side of the light pipe. Alternatively, the diffusion unit may be formed by subjecting the end surface on the emission side of the light pipe to frosted glass finishing or emboss processing.

In the above-mentioned head-up display device including the light pipe according to the present disclosure, the light pipe may be disposed at each of the positions where the lens array divides the entrance pupil to form an image.

With the above configuration, the light can be led by the light pipe at each position on which the lens array divides and focuses the entrance pupil. Therefore, the light emitted from the end surface of the light pipe can efficiently reach the eye box through the lens array and the display optical system. As a result, the image can be displayed with high luminance.

In the above-mentioned head-up display device including the light pipe according to the present disclosure, the light from the end surface on the emission side of the light pipe may be emitted toward the multiple small lenses included in the lens array.

With the above configuration, since the light from the light pipe can be supplied to the multiple small lenses, the number of light pipes can be reduced.

EMBODIMENTS FOR CARRYING OUT INVENTION

Hereinafter, an embodiment of the present disclosure will be described.

Figure 1A:
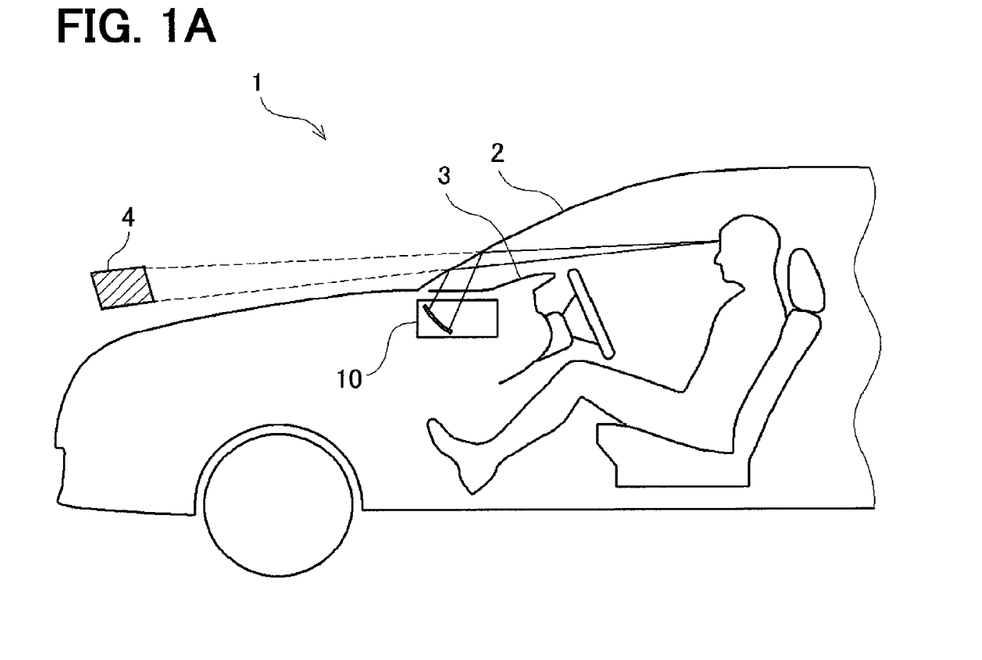
FIG. 1A is an illustrative view illustrating a state in which an HUD device according to the present embodiment is mounted in a vehicle.

FIG. 1A illustrates a state in which a head-up display device (hereinafter referred to as "HUD device") 10 according to the present embodiment is mounted in a vehicle 1. As illustrated in the figure, the head-up display device (hereinafter referred to as "HUD device") 10 according to the present embodiment is mounted in a dashboard 3 in front of the vehicle 1 when viewed from a driver's seat, and projects an image toward a windshield 2. The image projected from the HUD device 10 is reflected on the windshield 2, and arrives at driver's eyes. As a result, the driver recognizes a virtual image of the projected image as a display image 4 displayed across the windshield 2. The windshield 2 according to the present embodiment corresponds to a "plate member" in the present disclosure.

Figure 1B:
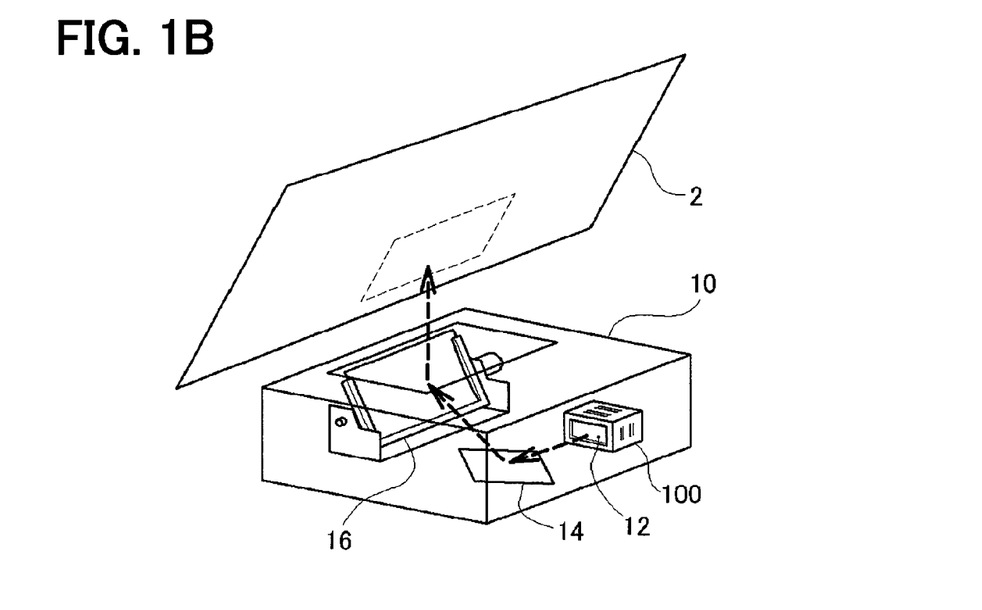
FIG. 1B is a perspective view illustrating the HUD device according to the present embodiment.

As illustrated in FIG. 1B, the HUD device 10 according to the present embodiment includes an image display unit 12 that is mainly configured by a liquid crystal display device and displays an image, and an illuminating device 100 that illuminates the image display unit 12 from a back side of the image display unit 12. The HUD device 10 also includes a plane mirror 14 that reflects the image displayed on the image display unit 12 and projected by the illuminating device 100, and a concave mirror 16 that further reflects the image reflected by the plane mirror 14, and projects the image onto the windshield 2. An enlarged image is projected onto the windshield 2 by the concave mirror 16, and the image is recognized by the driver.

The illuminating device 100 according to the present embodiment corresponds to "image illumination unit" in the present disclosure. The concave mirror 16 according to the present embodiment corresponds to "concave mirror element" in the present disclosure. Further, the plane mirror 14, the concave mirror 16, and the windshield 2 according to the present embodiment correspond to "display optical system" in the present disclosure.

In the HUD device 10 according to the present embodiment, it is assumed that the image display unit 12 is mainly configured by the liquid crystal display device. However, a reflection image display unit 12 that controls angles of minute reflectors arrayed in a matrix to display the image can be used. In that case, the image display unit 12 is illuminated from the front by the illuminating device 100.

In the HUD device 10 according to the present embodiment, the use of the concave mirror 16 enlarges the image projected onto the windshield 2. Alternatively, a transparent plate member called "combiner" may be disposed on a front side (driver side) of the windshield 2, and the combiner may be formed into a concave shape so that the image appears to be enlarged to the driver.

Figure 2:
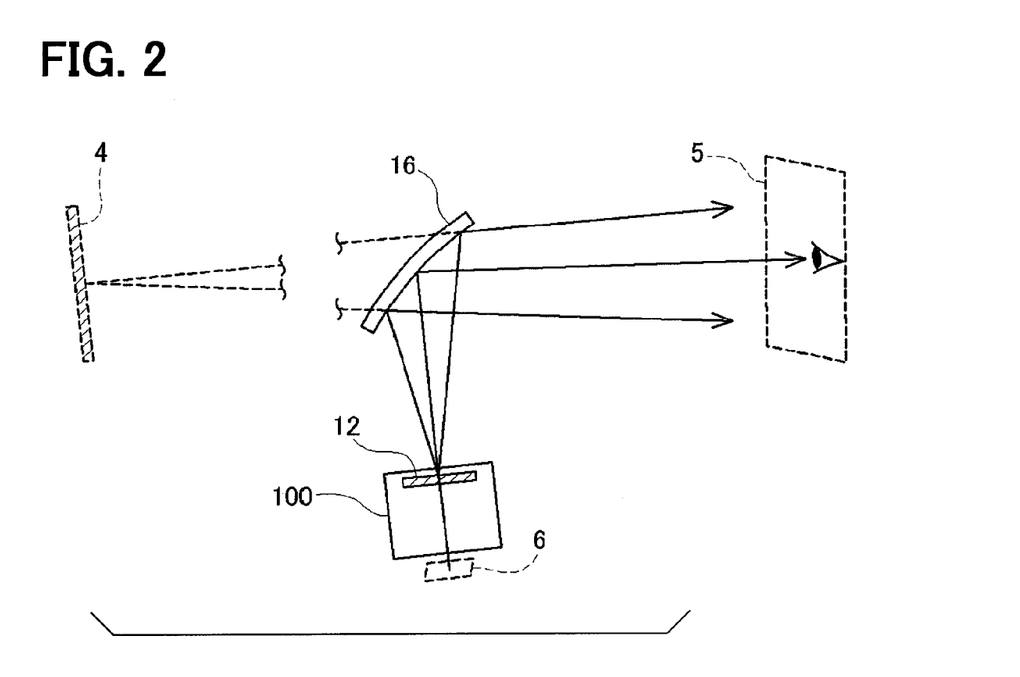
FIG. 2 is an illustrative view of a principle in which the HUD device displays an image on a liquid crystal screen as a virtual image.

FIG. 2 illustrates a principle in which the HUD device 10 according to the present embodiment enlarges the image displayed by the image display unit 12 to display the image as the virtual image. The plane mirror 14 is disposed in the HUD device 10, and the plane mirror 14 is configured to bend an optical path, and is directly irrelevant to the display of the image. Therefore, the plane mirror 14 is omitted in FIG. 2. The windshield 2 merely reflects the light projected from the concave mirror 16 toward the driver, and is irrelevant to a fact that the image is displayed as the virtual image. Therefore, the windshield 2 is omitted in FIG. 2.

In the present embodiment, only one concave mirror 16 is used. Alternatively, the image reflected on the concave mirror 16 may be further reflected by another concave mirror. In that case, the concave mirror 16 illustrated in FIG. 2 is representative of the multiple reflections by the multiple concave mirrors.

As illustrated in FIG. 2, the optical system of the HUD device 10 for enlarging the image displayed on the image display unit 12 to display the virtual image is called "HUD optical system" below.

In the HUD optical system, a focal distance of the concave mirror 16 is set to a relatively long value. The image display unit 12 is disposed at a position closer to the concave mirror 16 than a focal distance of the concave mirror 16. In an example illustrated in FIG. 1B, the plane mirror 14 is disposed between the image display unit 12 and the concave mirror 16. Therefore, a total of a distance from the image display unit 12 to the plane mirror 14, and a distance from the plane mirror 14 to the concave mirror 16 is shorter than the focal distance of the concave mirror 16. With the above configuration, the image on the image display unit 12 which is reflected by the concave mirror 16 is recognized by the driver as the virtual image.

A position at which the virtual image is displayed at that time, and a magnification of the virtual image to the image on the image display unit 12 become a position and a magnification which are calculated through a predetermined formula on the basis of the focal distance of the concave mirror 16 and the distance from the image display unit 12 and the concave mirror 16.

Since a height of the driver of the vehicle 1 and a posture of the driver seated in the driver's seat are different depending on the driver, a position of the driver's eyes also changes according to the height and the posture. Under the circumstances, in the HUD device 10, assuming a predetermined region around a position of the representative driver's eyes, the HUD optical system is set so that the driver can visually recognize the virtual image so far as the driver's eyes fall within the region. The predetermined region thus set is called "eye box 5".

It is needless to say that the virtual image with sufficient luminance needs to be displayed so far as the driver's eyes fall within an eye box 5. To achieve this, the luminance of the light source for illuminating the image display unit 12 from the back surface may be increased so that the luminance of the image to be displayed on the image display unit 12 may increase. However, this causes various adverse effects such that the amount of heat radiation of the light source increases.

Under the circumstances, it is conceivable that the same effects as those when the luminance of the light source is increased are obtained by allowing the light from the light source to effectively arrive at the eye box 5. To achieve this, the light of the light source may be effectively supplied toward an entrance pupil 6 of the eye box 5 produced by the concave mirror 16. In the present specification, the entrance pupil 6 of the eye box 5 represents a real image of the eye box 5 imaged on the image display unit 12 side by the concave mirror 16. Since the entrance pupil 6 of the eye box 5 and the eye box 5 have a conjugate relationship by the concave mirror 16, the light that passes through the entrance pupil 6 (as long as the light travels toward the concave mirror 16) always passes through the eye box 5. Therefore, if the light from the light source can be efficiently led to the entrance pupil 6, the light always reaches the eye box 5 with the results that the amount of light can increase, and the same effects as those when the luminance of the light source is increased can be obtained.

As an optical system based on the above idea, there is an optical system used to illuminate an observation sample in a microscope. In the microscope, although the amount of light tends to be short since a diameter of the lens is small, an injudicious increase in the luminance of the light source may cause the observation sample to be thermally affected by the light source. Under the circumstances, the microscope employs a specific optical system as an illumination optical system. The specific optical system is configured so that an observer can observe the sample with sufficient brightness by supplying the light from the light source to the entrance pupil of an eyepiece.

However, the position of the observer's eyes is fixed to a position of the eyepiece in the microscope whereas the position of the observer's eyes can be freely moved in an area of the eye box 5 in the HUD device 10. In generally, the size of the eye box 5 is set in a range of about 15 to 20 centimeters in a horizontal direction and about 5 to 10 centimeters in a vertical direction. Therefore, as compared with the entrance pupil (that is, a real image of the eyepiece obtained by the optical system of the microscope) of the microscope has a size as large as a dot, the entrance pupil 6 of the HUD device 10 is remarkably large. For that reason, it is expected that the illumination optical system used for the microscope cannot be applied to the illumination of the HUD device 10 as it is.

Figure 3:
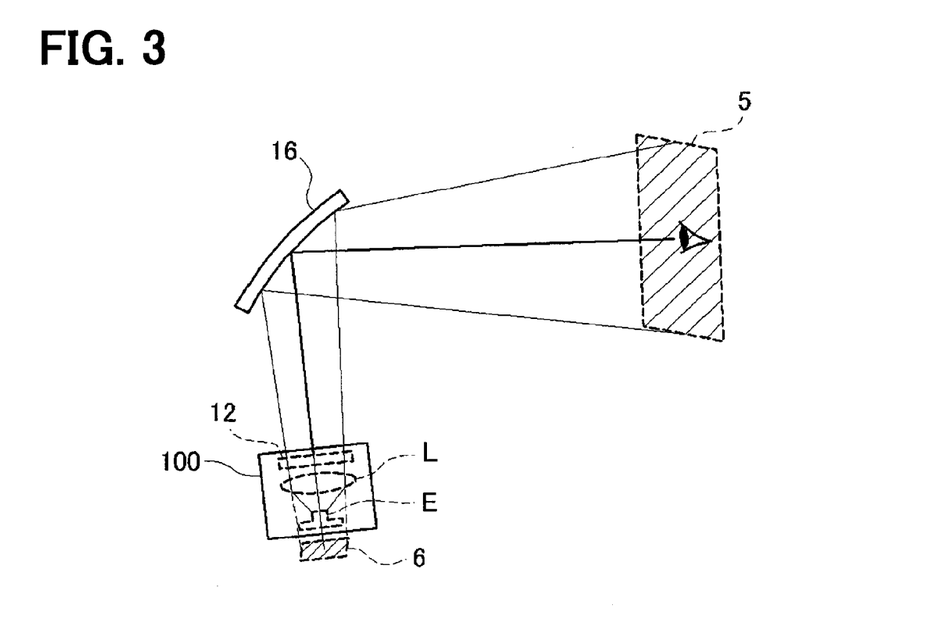
FIG. 3 is an illustrative view of a principle in which the HUD device displays the image on the liquid crystal screen with high luminance.

FIG. 3 conceptually illustrates the optical system for illuminating the image display unit 12 from the back surface in the HUD device 10. In order to distinguish from the optical system (HUD optical system) for displaying the image of the image display unit 12 as the virtual image, the optical system for illuminating the image display unit 12 from the back surface is called "illumination optical system" below.

As described above, since the entrance pupil 6 of the HUD device 10 may be considered as the real image of the eye box 5 obtained through the concave mirror 16, the position at which the entrance pupil 6 is formed is determined according to the focal distance of the concave mirror 16 and the distance from the concave mirror 16 to the eye box 5. As illustrated in FIG. 3, the above-described position is far behind the image display unit 12. The size of the entrance pupil 6 is determined according to the focal distance of the concave mirror 16, the distance from the concave mirror 16 to the eye box 5, and the size of the eye box 5.

Therefore, the illumination optical system of the HUD device 10 is configured to focus the entrance pupil 6, which would be formed behind the image display unit 12 through the HUD optical system, onto a light emitting surface of a light source E using a lens L.

Because the HUD device 10 needs to be reduced in size from the viewpoint that the HUD device 10 is mounted in the vehicle 1, a distance from the image display unit 12 to the light source E may not be set to be much long. Therefore, the lens L with a short focal distance is required so that the size of the entrance pupil 6 of the eye box 5 can be reduced to that of the light source E (the size of about several millimeters in diameter if the light source E is an LED) at a relatively short distance. In addition, since the entire surface of the image display unit 12 needs to be illuminated, the lens L needs to have a sufficient diameter.

When the specification of the lens L is studied with the use of real numeric values, the lens cannot be manufactured or the specification does not sufficiently function as the lens even if the lens can be manufactured. In other words, even if the illumination optical system employed in the microscope is to be applied to the illumination optical system of the HUD device 10, such an illumination optical system cannot be established. Under the circumstances, the HUD device 10 and the illuminating device 100 according to the present embodiment employ an illumination optical system described below.

Figure 4A:
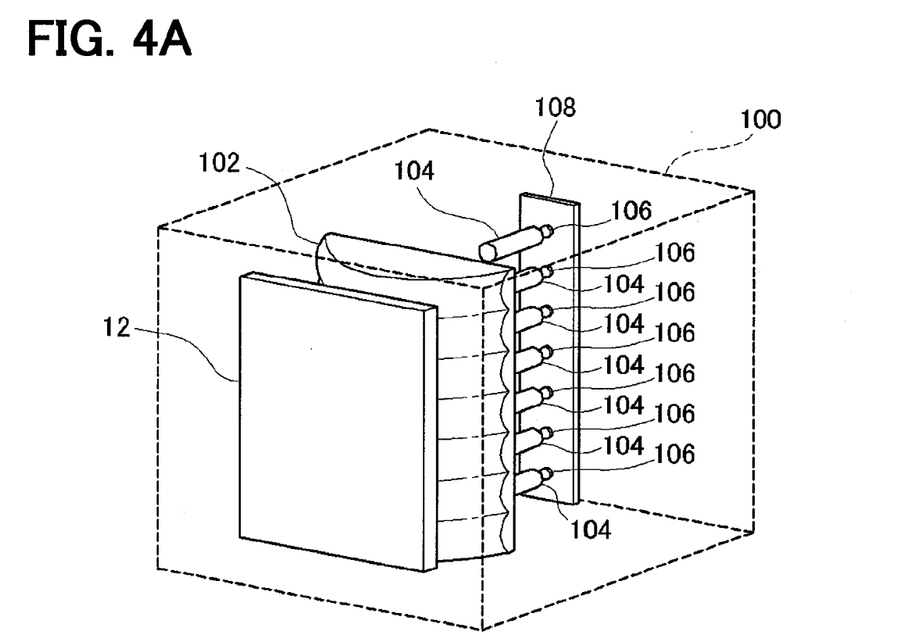
FIG. 4A is an illustrative view illustrating an internal structure of an illuminating device mounted in the HUD device according to the present embodiment.
Figure 4B:
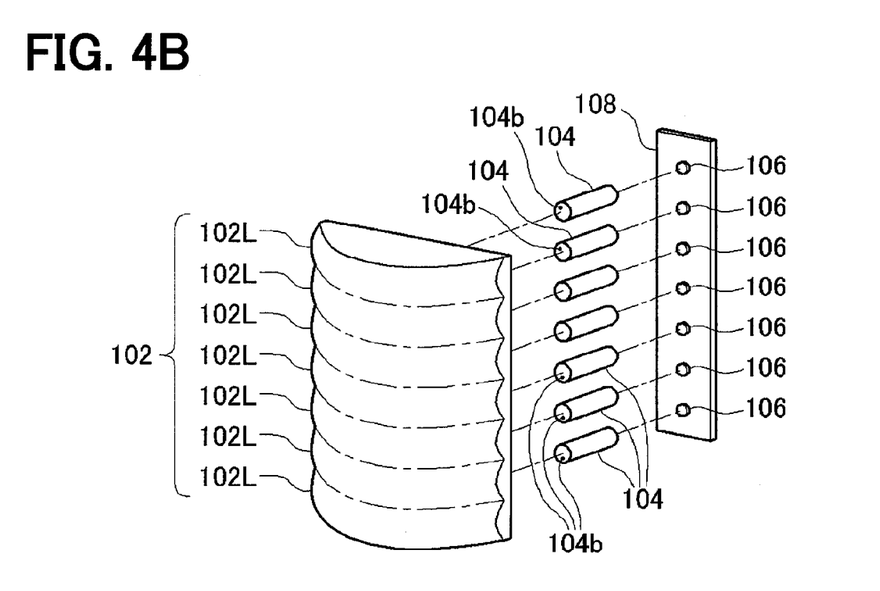
FIG. 4B is an exploded view illustrating an illumination optical system incorporated into the illuminating device according to the present embodiment.

FIG. 4B illustrates an internal structure of the illuminating device 100 mounted in the HUD device 10 according to the present embodiment. FIG. 4B illustrates an exploded view of the illumination optical system incorporated into the illuminating device 100.

As shown in the figures, a lens array 102 in which multiple small lenses 102L are continuously formed each other is disposed on a back side of the image display unit 12 mainly formed of a liquid crystal screen.

Each of cylindrical light pipes 104 is disposed at a back side of the respective small lens 102L one by one. The light pipes 104 are made of a transparent material such as acrylic resin or glass, and a metal film is deposited on each outer peripheral side surface of the light pipes 104, and each inner peripheral surface of the light pipes 104 forms a reflective mirror. Further, both end surfaces of each cylinder of the light pipes 104 are optically polished.

For that reason, the light input into each of the light pipes 104 from one end surface of the light pipe 104 travels into the light pipe 104 while the light is repetitively reflected on the inner peripheral side surface of the light pipe 104, and is output from the other end surface 104b. Because the end surface 104b from which the light is emitted faces the lens array 102, the light emitted from the end surface 104b is input into a respective one of the small lenses 102L.

Further, each of LEDs 106 as the light sources is provided on a side of another end surface of the corresponding light pipe 104. Because the LEDs 106 are disposed in the vicinity of the end surfaces of the respective light pipes 104, almost all of the light emitted from the LEDs 106 is input into the respective light pipes 104 from the end surfaces. The input light travels in the respective light pipes 104 while the light is repetitively reflected on the inner peripheral side surface of the light pipe 104.

Therefore, even when the luminance or color is biased in the light emitted by the LEDs 106, the bias is equalized by the repetitive reflection of the light on the inner peripheral side surfaces of the light pipes 104. The equalized light without any bias of the luminance and color is output from the end surface 104b facing the small lenses 102L.

In the illuminating device 100 according to the present embodiment, the end surfaces 104b from which the light pipes 104 emit the light toward the small lenses 102L are disposed at the following positions, that is, positions at which the entrance pupil 6 of the eye box 5 obtained through the HUD optical system is focused by the small lenses 102L.

Figure 5A:
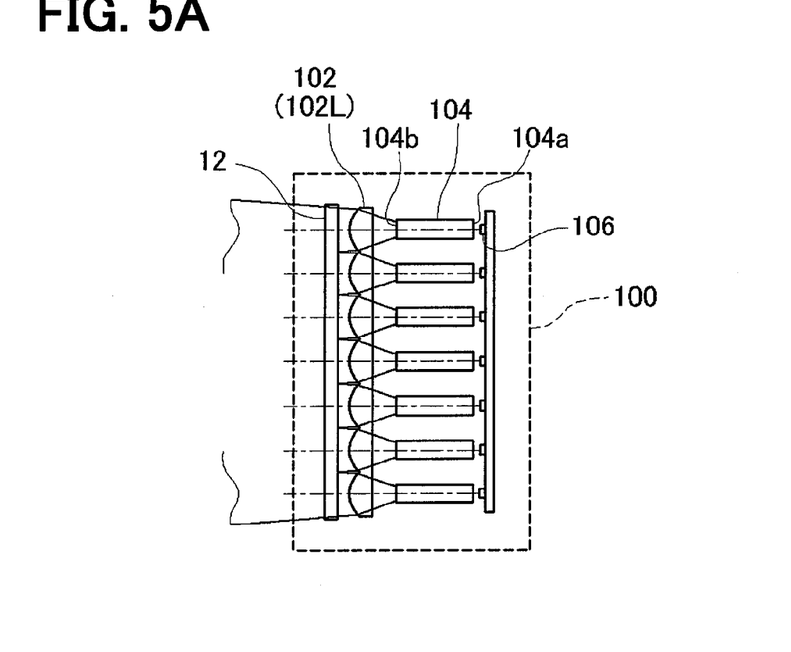
FIG. 5A is a cross-sectional view illustrating a state in which the illuminating device according to the present embodiment illustrates a liquid crystal screen from a back surface of the liquid crystal screen.
Figure 5B:
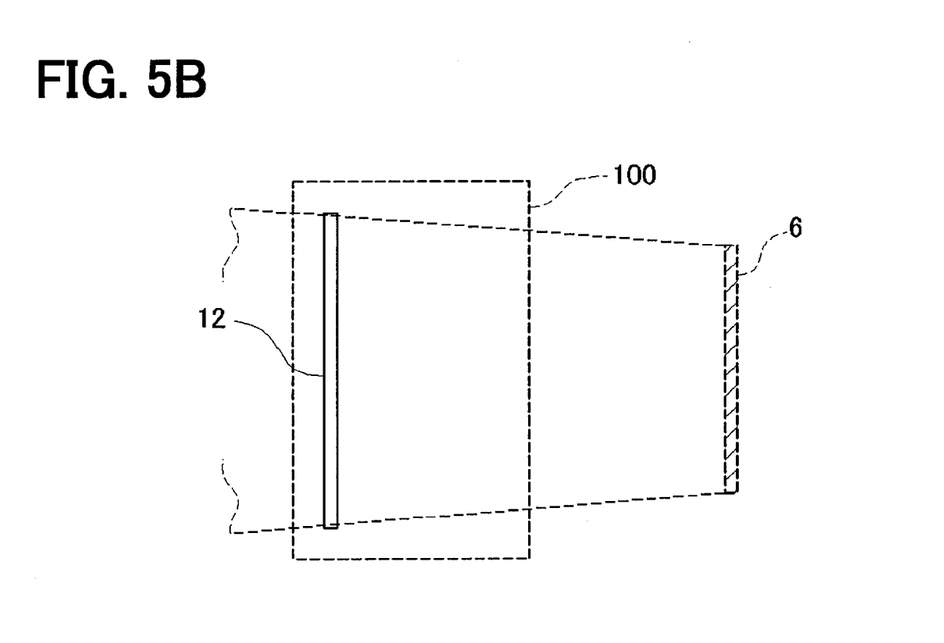
FIG. 5B is a reference diagram illustrating an entrance pupil of an eye box obtained through an HUD optical system according to the present embodiment.

The above configuration will be described in detail with reference to FIGS. 5A and 5B. FIG. 5A illustrates a cross-section of the illuminating device 100 taken at a position of a center axis of the light pipes 104. FIG. 5B illustrates the entrance pupil 6 of the eye box 5 obtained through the HUD optical system for reference.

As illustrated in FIG. 5B, the entrance pupil 6 of the eye box 5 is formed far behind the illuminating device 100. In the present embodiment, as illustrated in FIG. 5A, the entrance pupil 6 is divided by the small lenses 102L. The end surface 104b of each light pipe 104 is disposed at a position where each of the small lenses 102L focuses the entrance pupil 6 of the eye box 5. For that reason, when the light of each LED 106 is input from the other end surface 104a of each light pipe 104, the uniform light emitted from the end surface 104b can be supplied to an optical path in which the HUD optical system focuses the entrance pupil 6.

When the same operation occurs in all the light pipes 104, the optical path in which the HUD optical system focuses the entrance pupil 6 can be satisfied by the uniform light emitted from the end surface 104b. As a result, the overall region of the eye box 5 can be uniformly illuminated without any bias of the luminance and color. Accordingly, even if the position of the driver's eyes moves within the eye box 5, the appearance (illuminance and color) of the image can be prevented from changing.

In the present embodiment, the end surfaces 104b on the side of emitting the light from the light pipes 104 correspond to "light emitting surface" in the present disclosure.

Since the entrance pupil 6 of the eye box 5 and the eye box 5 have the conjugate relationship through the HUD optical system (concave mirror 16 in the example illustrated in FIG. 2), all of the light emitted from the end surfaces 104b of the light pipes 104 reaches the eye box 5 in principle. For that reason, since the light can be efficiently used for illumination, the image with sufficient brightness can be displayed if the driver's eyes are within the eye box 5.

In addition, the light emitting surfaces of the LEDs 106 are disposed in close proximity to the other end surfaces 104a of the light pipes 104. For that reason, almost all of the light emitted from the LEDs 106 is input into the respective light pipes 104, and the input light is reflected on the inner peripheral surfaces of the respective light pipes 104, and emitted from the end surfaces 104b substantially without any loss.

Finally, since almost all of the light emitted from the LEDs 106 can be used for illumination, the illumination efficiency is enhanced, and the image can be displayed with sufficient brightness without any increase in the luminance of the light source.

Since almost all of the light emitted from the LEDs 106 is supplied to the lens array 102 through the light pipes 104, the generation of light (so-called "stray light") not involved in the display of the image is suppressed. For that reason, since the clear virtual image with high contrast can be displayed, a problem that the virtual image appears double can be prevented from occurring.

Further, since the respective small lenses 102L forming the lens array 102 are small in diameter, the focal distance can be shortened. Moreover, the sufficient diameter can be realized as the overall lens array 102. For that reason, the illuminating device 100 that illuminates the overall image display unit 12 can be realized while the short distance from the image display unit 12 to the LEDs 106 is kept.

In the above embodiment, the light emitted from the end surfaces 104b of the light pipes 104 is supplied to the respective small lenses 102L as it is. Alternatively, the light from the end surfaces 104b may be supplied to the respective small lenses 102L through a diffusion plate.

Figure 6A:
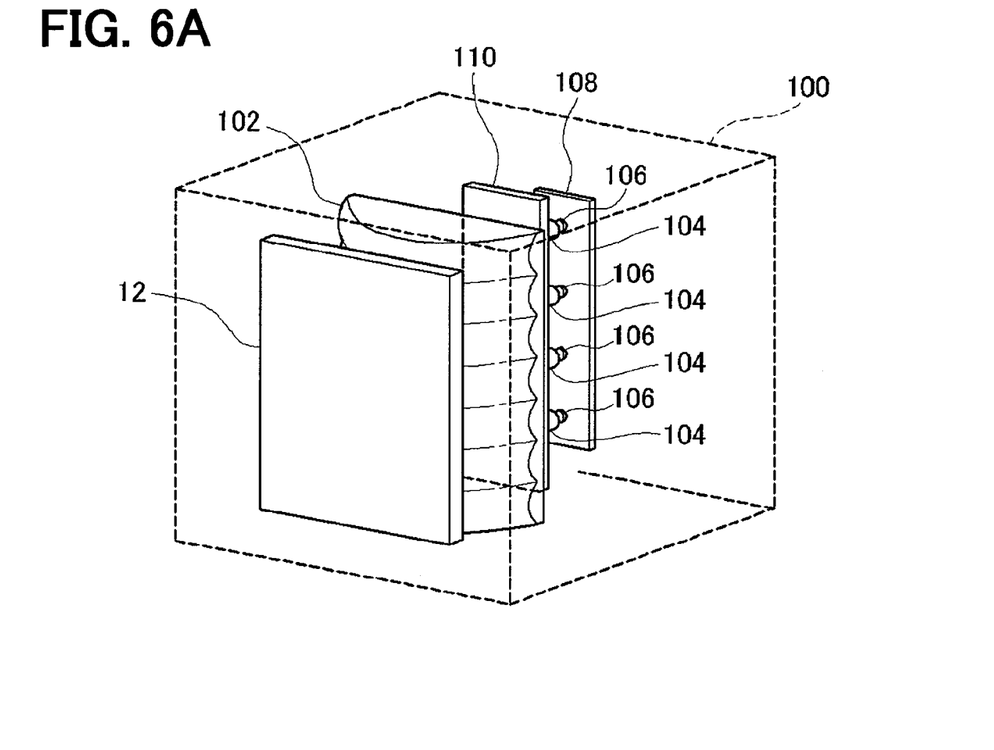
FIG. 6A is an illustrative view illustrating an internal structure of an illuminating device according to a modification.
Figure 6B:
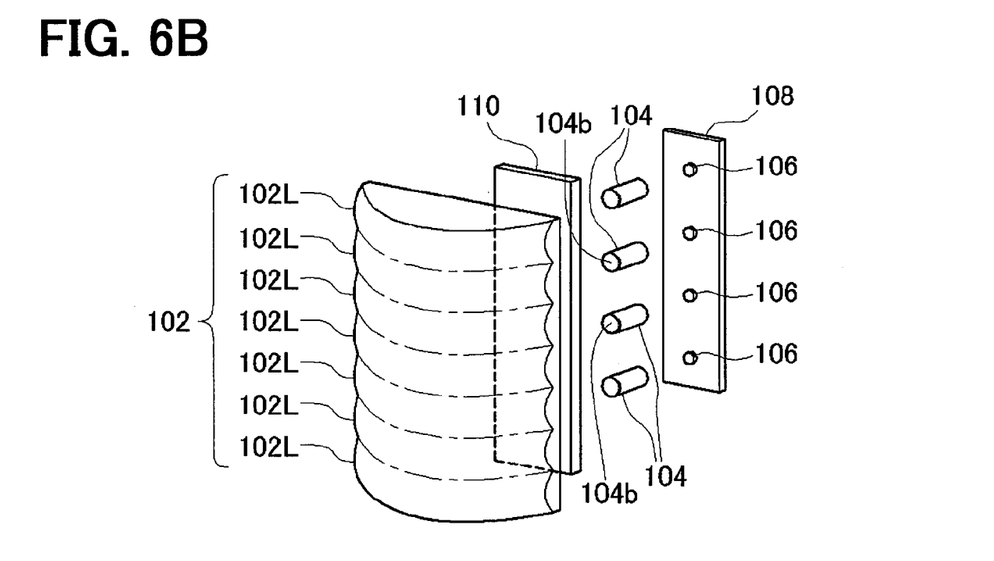
FIG. 6B is an exploded view illustrating an illumination optical system incorporated into the illuminating device according to the modification.

FIGS. 6A and 6B illustrate an illuminating device 100 according to a modification in which a diffusion plate 110 is disposed between the lens array 102 and the light pipes 104. The diffusion plate 110 can be made of a so-called "frosted glass" or formed of an acrylic plate in which fine particles are dispersed.

When the diffusion plate 110 is used, it is desirable that a position at which the small lenses 102L focus the entrance pupil 6 of the eye box 5 obtained through the HUD optical system is ideally on a surface of the diffusion plate 110 that faces the lens array 102. However, in fact, no practical problem occurs even if the diffusion plate 110 is added at a front side of the end surfaces 104b in a state where the entrance pupil 6 is kept to be focused on the end surfaces 104b of the light pipes 104.

In the present modification, the diffusion plate 110 is provided in addition to the light pipes 104. Alternatively, the end surfaces 104b on the emission side of the light pipes 104 may be subjected to frosted glass finishing or emboss processing, or a frosted glass-like thin film may be stuck onto the end surfaces 104b on the emission side.

The diffusion plate 110 according to the present modification corresponds to "diffusion unit" in the present disclosure.

Since the diffusion plate 110 diffuses the light emitted from the end surfaces 104b of the light pipes 104, the diffusion plate 110 has the effect of supplementing the function for equalizing the light by the light pipes 104. For that reason, by disposing the diffusion plate 110 at the end surfaces 104b of the light pipes 104, the length of the light pipes 104 can be shortened, and the illuminating device 100 can be reduced in size.

The light from the end surfaces 104b of the light pipes 104 is emitted with directivity in directions of center axes of the respective light pipes 104. The diffusion plate 110 has the effect of weakening the directivity, and the light that has passed through the diffusion plate 110 is evenly emitted with a certain spread. For that reason, as described above, the light pipes 104 and the LEDs 106 are not provided for the respective small lenses 102L one by one, but the light can be supplied to the multiple small lenses 102L from one light pipe 104 and one LED 106. As a result, since the number of the light pipes 104 and the number of LEDs 106, which are mounted in the illuminating device 100, can be reduced, the possibility of failure can be reduced, and the device can be easily manufactured.

In addition, by using the diffusion plate 110, the illuminating device 100 can be further reduced in size because of the following reasons. In other words, as illustrated in FIG. 7A, if the small lenses 102L forming the lens array 102 are reduced in size, since the focal distance of the lens array 102 can be further shortened, the light pipes 104 can be positioned close to the lens array 102.

Figure 7A:
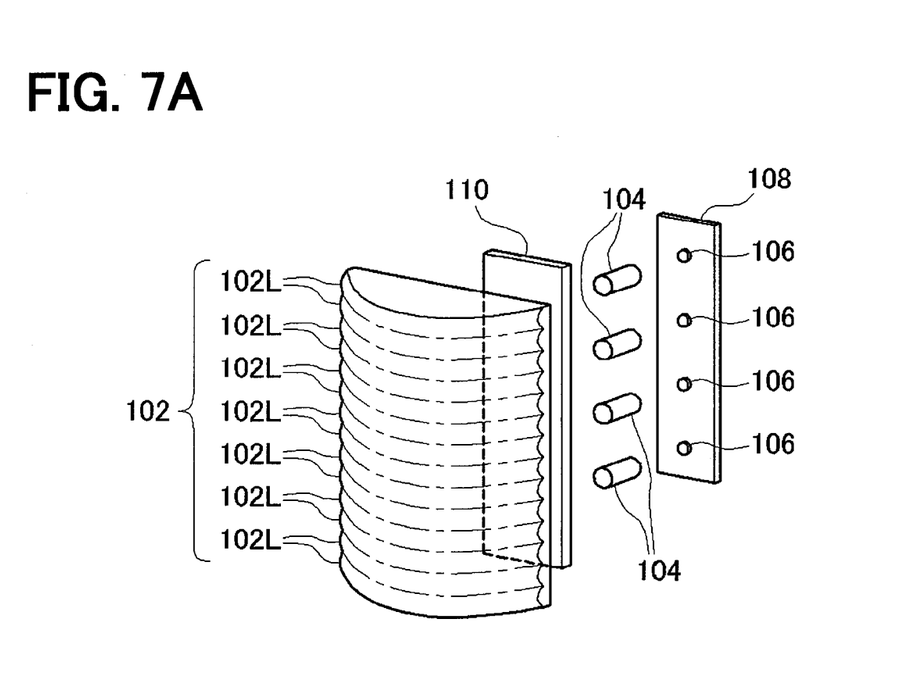
FIG. 7A is an illustrative view illustrating an internal structure of an illuminating device downsized with a reduction in the size of small lenses.
Figure 7B:
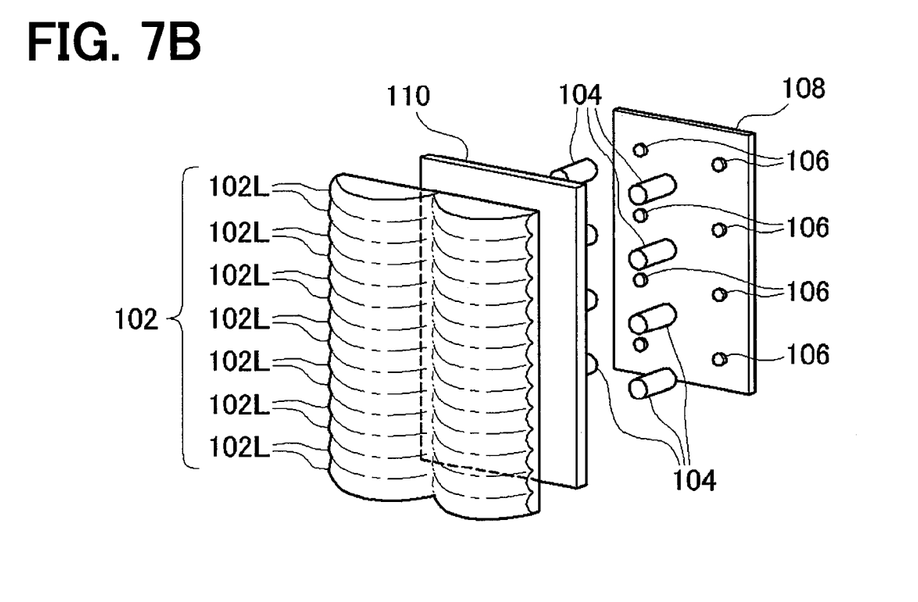
FIG. 7B is an illustrative view illustrating an internal structure of an illuminating device downsized by arraying small lenses in multiple rows.

Further, as illustrated in FIG. 7B, if the small lenses 102L are arrayed in multiple rows, the size of the lens array 102 can be also reduced.

It is needless to say that as illustrated in FIG. 7A, when the small lenses 102L are reduced in size, the number of small lenses 102L included in the lens array 102 becomes larger. However, by using the diffusion plate 110, the light can be supplied to the multiple small lenses 102L from one light pipe 104 and one LED 106. For that reason, even if the number of the small lenses 102L included in the lens array 102 increases, the numbers of light pipes 104 and LEDs 106 can be restrained from increasing.

The embodiments have been described above, but the present disclosure is not limited to the above embodiments, and can be implemented with various configurations without departing from the spirit of the present disclosure.

Figure 8:
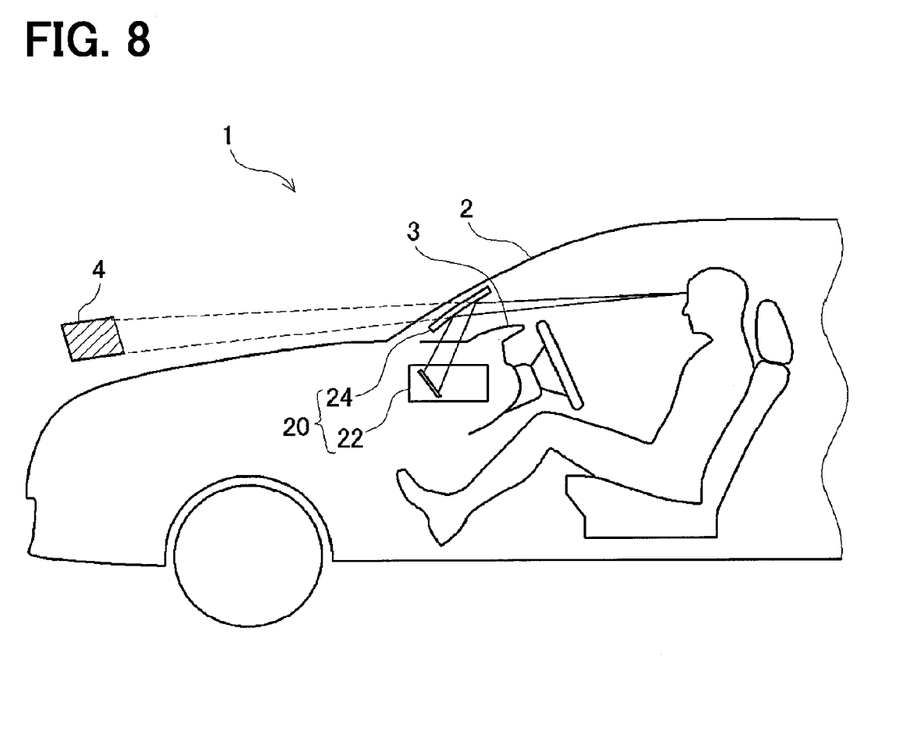
FIG. 8 is an illustrative view illustrating a modification applied to an HUD device having a combiner.

For example, in the above embodiments, the image is projected onto the windshield 2 with the use of the concave mirror 16 to display the virtual image for the driver. Alternatively, as illustrated in FIG. 8, a combiner 24 made of a transparent material and formed into a concave shape may be disposed on a front side of the windshield 2, and the image may be projected onto the combiner 24 from a projection device 22 to form the HUD device 20.

What is claimed is:

1. A head-up display device for displaying an image, as a virtual image, to be superimposed on a view in front of a driver, the head-up display device comprising:
    an image display unit that displays the image to be displayed as the virtual image;
    an image illumination unit that illuminates the image displayed on the image display unit; and
    a display optical system that has at least one concave mirror element to display the illuminated image as the virtual image for the driver, wherein
    the image illumination unit includes
        a plurality of light collectors each having a light emitting surface that emits light for the illumination, and
        a lens array including a plurality of lens elements disposed between the image display unit and the plurality of light collectors, each of the plurality of lens elements corresponding to a respective one of the plurality of light collectors.

2. The head-up display device according to claim 1, wherein
an eye box is assumed as an area in which the driver's eye exist,
an entrance pupil of the eye box is formed through the display optical system, and
the lens array divides and focuses the entrance pupil of the eye box onto the light emitting surfaces of the plurality of light collectors.

3. The head-up display device according to claim 1, wherein
the display optical system includes a transparent plate member disposed in front of the driver, and a concave mirror that projects the image toward the plate member.

4. The head-up display device according to claim 1, wherein
the image display unit is a transmission display unit that displays the image by changing transmittance of the light, and
the image illumination unit illuminates the image from a back side of the image display unit.

5. The head-up display device according to claim 4, wherein
each of the plurality of light collectors is a light pipe that reflects a light of a light source, which was input from one end side of the light pipe, with an inner peripheral side surface to emit the light from an other end side of the light pipe, and
in each of the plurality of light pipes, the light emitting surface is the one end side of the light pipe.

6. The head-up display device according to claim 5, wherein
a diffusion unit is disposed at the one end side of the plurality of light pipes to diffuse the light emitted from the one end side.

7. The head-up display device according to claim 5, wherein
the plurality of light pipes are disposed at each position on which the lens array divides and focuses the entrance pupil.

8. The head-up display device according to claim 6, wherein
the plurality of light pipes emit the light from the one end side toward the plurality of lens elements included in the lens array.

9. The head-up display device according to claim 1, wherein
the image illumination unit includes a light source, and
the plurality of light collectors are disposed between the light source and the lens array.

10. An illuminating device for a head-up display device that displays an image, as a virtual image, to be superimposed on a view in front of a driver, the illuminating device illuminating the image to be displayed as the virtual image, the illuminating device comprising:
an image display unit that displays the image to be displayed as the virtual image;
a plurality of light collectors each having a light emitting surface that emits a light for illuminating the image; and
a lens array including a plurality of lens elements disposed between the image display unit and the plurality of light collectors, each of the plurality of lens elements corresponding to a respective one of the plurality of light collectors.

* * * * *